(12) United States Patent
Bolt et al.

(10) Patent No.: US 7,620,533 B2
(45) Date of Patent: Nov. 17, 2009

(54) METHOD AND SYSTEM FOR DETECTING CHANGE IN DATA STREAMS

(75) Inventors: George Bolt, Hampshire (GB); John Manslow, Hampshire (GB)

(73) Assignee: Cerebrus Solutions Limited, Harlow (GB)

( * ) Notice: Subject to any disclaimer, the term of this patent is extended or adjusted under 35 U.S.C. 154(b) by 261 days.

(21) Appl. No.: 11/654,800

(22) Filed: Jan. 18, 2007

(65) Prior Publication Data

US 2007/0118344 A1    May 24, 2007

Related U.S. Application Data

(63) Continuation of application No. 10/971,715, filed on Oct. 22, 2004, now abandoned, which is a continuation of application No. PCT/AU03/00493, filed on Apr. 24, 2003.

(30) Foreign Application Priority Data

Apr. 24, 2002    (GB)    ................... 0209368.0

(51) Int. Cl.
    *G06F 17/10*    (2006.01)
(52) U.S. Cl. .......................... 703/2; 702/183
(58) Field of Classification Search ....................... 703/2
    See application file for complete search history.

(56) References Cited

U.S. PATENT DOCUMENTS

| | | | |
|---|---|---|---|
| 4,809,817 A | 3/1989 | Kawai | |
| 5,354,957 A | 10/1994 | Robertson | |
| 5,603,331 A | 2/1997 | Heemels et al. | |
| 5,847,266 A | 12/1998 | Nevruz et al. | |
| 6,182,022 B1 | 1/2001 | Mayle et al. | |
| 6,262,550 B1 | 7/2001 | Kilman et al. | |
| 6,321,338 B1 | 11/2001 | Porras et al. | |
| 6,675,128 B1 | 1/2004 | Hellerstein | |
| 2002/0133320 A1 | 9/2002 | Wegerich et al. | |
| 2003/0140039 A1* | 7/2003 | Ferguson et al. | ................ 707/4 |

OTHER PUBLICATIONS

William H. Press et al., "Numerical Recipes in C", 1988, Cambridge University Press, pp. 473, 481.*

Qu, Diheng, et al., *Statistical Anomaly Detection for Link-State Routing Protocols*, Network Protocols, 1998 pp. 62-70, ISBN: 0-8186-8988-9.

Iguchi, Makoto, et al., *Network Surveillance for Detecting Intrusions*, Internet Workshop, 1999, pp. 99-106, ISBN: 0-7809-5925-9.

(Continued)

*Primary Examiner*—Paul L Rodriguez
*Assistant Examiner*—Russ Guill
(74) *Attorney, Agent, or Firm*—Knobbe Martens Olson & Bear LLP

(57) ABSTRACT

A system for detecting change in a data stream comprising a distribution maintenance engine, a difference determining means and an alert generation engine is disclosed. The system detects change in the alert stream by the distribution maintenance engine maintaining a short term distribution that models the data stream and maintaining a long term distribution that models the data stream. The difference determining means determines the difference between the short term distribution and the long term distribution. The alert generation engine applies a statistical measure to the difference and generates an alert if the measure of the difference exceeds a threshold.

30 Claims, 2 Drawing Sheets

OTHER PUBLICATIONS

Anderson, Debra, et al., *Detecting Unusual Program Behavior Using the Statistical Component of the Next-generation Intrusion Detection Expert System (NIDES)*, May 1995, SRI International, Report SRI-CSL-95-06.

Javitz, Harold S., et al., *The NIDES Statistical Component: Description and Justification*, Mar. 1993, SRI International.

Ho, L. Lawrence, et al., *Adaptive Anomaly Detection in Transaction-Oriented Networks*, 2001, Journal of Network and Systems Management, vol. 9, No. 2, pp. 139-159.

Fawcett, T., Provost, F., *Adaptive Fraud Detection*, Data Mining and Knowledge Discovery Journal, Kluwer Academic Publishers, vol. 1, No. 3, 1997, pp. 1-29.

* cited by examiner

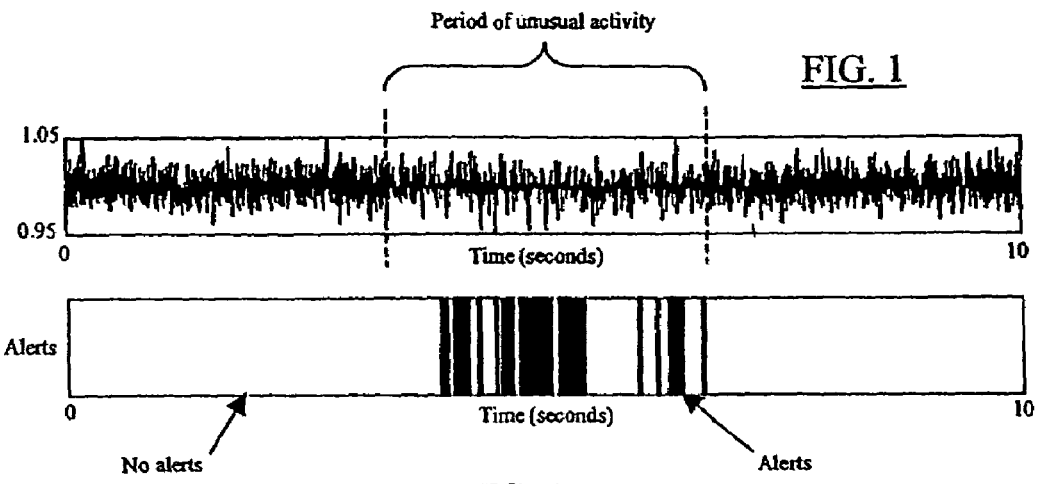
FIG. 1
FIG. 4
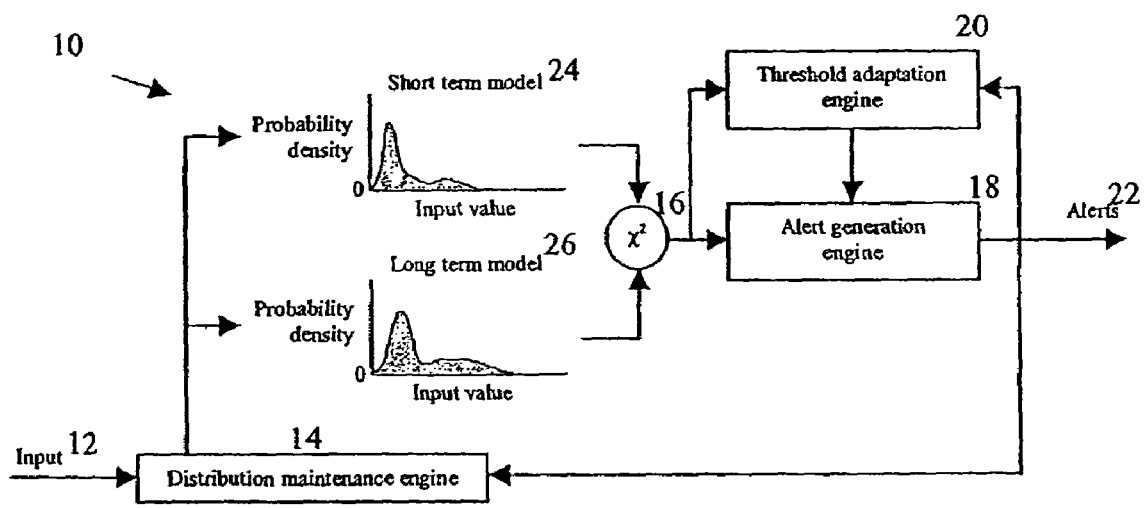
FIG. 2

METHOD AND SYSTEM FOR DETECTING CHANGE IN DATA STREAMS

RELATED APPLICATION

This application is a continuation of U.S. patent application Ser. No. 10/971,715, filed on Oct. 22, 2004, now abandoned, which is a continuation application, and claims the benefit under 35 U.S.C. §§ 120 and 365 of PCT Application No. PCT/AU03/00493, filed on Apr. 24, 2003 and published Nov. 6, 2003, in English, which is hereby incorporated by reference.

BACKGROUND OF INVENTION

1. Filed of the Invention

The invention relates to the detection of changes in data streams. In particular, the present invention seeks to detect a change in a data stream created by a target event.

2. Description of the Related Technology

Change detection systems find a wide variety of applications, including, but not limited to, fraud detection (for example, looking for changes in patterns on credit card usage), security systems (for example, detecting attacks on computer networks), process, fault and condition monitoring (for example, looking for changes in the pattern of vibration in vehicle engines), environmental monitoring systems (for example, identifying chemical spillage and pollution), and health monitoring (for example, to alert medical workers of sudden changes in the condition of patients). To detect changes in practice, entities and processes are typically monitored by taking regular measurements of critical parameters such as those parameters that are most likely to contain information about the changes of interest. Changes are usually identified by comparing the parameters to thresholds, designed to indicate a target event, with an alert generated if the thresholds are exceeded. Such thresholds are usually not fixed, but are functions of statistics extracted from a data stream containing information about the system being monitored, such as its mean, variance or percentiles.

The change detection performance of such systems is limited by several factors. Firstly, unless the thresholds are effectively set to extreme percentiles (such as the $99^{th}$) the number of false alerts—those generated even when no significant change in the data stream has occurred—will be too high for many practical applications. For example, a classic application of the invention is to monitor calls in large telecommunications networks for unusual activity that may be indicative of fraud. Since it is not uncommon for such networks to support 100 million calls per day, a threshold based on the $99^{th}$ percentile would generate around 1 million false alerts per day (assuming that the percentile estimate is accurate, and that the call statistics are ergodic), which is over 1,000 times the number that can be processed by the fraud investigation teams employed by most telecommunications companies. In practice, gradual changes in the way in which the telecommunications network is used will cause the false alert rate to be even higher than the 1 percent that the $99^{th}$ percentile would prima facie imply. For example, the growth of internet usage has produced a gradual increase in the number of exceptionally long calls—those over two hours—which has been sustained over several years. The affects of such changes on the false alert rate of percentile-based algorithms cannot readily be alleviated by increasing the percentile used to, for example, the $999^{th}$ because not only does that increase the risk of missing the more subtle frauds, but more extreme percentiles also take longer to estimate. This time factor is important because a reasonable estimate of the percentile must be formed before the algorithm can produce useful fraud alerts, increasing the risk that major frauds are missed because they are committed before the algorithm is ready to detect them.

A more fundamental limitation of the use of thresholds is that not all changes that can conceivably occur in a data stream can be detected by them. Assume, for example, that a change detection algorithm is used to monitor the condition of the suspension of a car through the periodic measurement of the extension of a spring attached to one of the car's wheels. Ten seconds worth of simulated measurements are shown in the top graph shown in FIG. 1. Assuming that the normal behaviour of the suspension is that there is wide variation in the spring length, as shown in the regions of the top graph of FIG. 1 that lie outside the dashed lines, it is possible that some modes of failure, such as periodic seizure, can cause the spring length to show less variation, as occurs between the dashed lines. This change in behaviour cannot be detected using thresholds because there is no threshold that can be placed on the measured parameter—that is, spring length—that would cause substantially more alerts to be generated when the suspension behaves pathologically than when it behaves normally. In summary, threshold based systems can only detect changes where there is a substantial shift in the proportion of the probability mass of the contents of the data stream from below to above the threshold (or vice versa) and the choice of threshold is necessarily restricted to extreme percentiles to minimise the rate at which false alerts are generated.

SUMMARY OF CERTAIN INVENTIVE ASPECTS OF THE INVENTION

One aspect of the invention seeks to provide an improved method of detecting changes in data streams, and the information they contain.

Another aspect of the invention provides a method of detecting changes in the properties of a data stream comprising: maintaining a short term distribution that models the data stream; maintaining a long term distribution that models the data stream; determining a difference between the short term distribution and the long term distribution; and applying a statistical measure to the difference and generating an alert if the measure of the difference exceeds a threshold.

In one embodiment, the short term distribution is a model of probability distributions that describe the data stream. Preferably, the long term distribution is a model of probability distributions that describe the data stream.

In one embodiment, the short term distribution is a recursively estimated weighted distribution of all the data received thus far. Preferably, the long term distribution is a recursively estimated weighted distribution of all of the data received thus far. Preferably, the short term distribution weights recent information more heavily than the long term distribution.

In one embodiment, the short term distribution is updated when input data is received. In one embodiment, the long term distribution is updated when the input data is received.

In one embodiment, when an alert is generated the short term distribution is returned to a state just before it was updated to include an input that caused the alert. Preferably, the long term distribution is also returned to a state just before it was updated to include an input that caused the alert.

In one embodiment, an alert is generated if the difference between the distributions exceeds an adaptive alert threshold. Preferably, the adaptive alert threshold is determined as some function of the short and long term distributions, previous values of the threshold, the contents of the data stream, or a subset thereof. Preferably, the adaptive alert threshold is formed from a predictability measure and a variability measure. Preferably, the predictability measure is a moving average of the difference between the short term distribution and the long term distribution. Preferably, the variability measure is a moving average of the absolute difference between the short term distribution and the long term distribution and the predictability measure. Preferably, neither the predictability nor variability measures are updated when an alert is generated.

In one embodiment, the alert generated includes information in the data stream and/or a function of information in the data stream. Typically, the alert includes a propensity measure as an indication of the severity of change. Preferably, the propensity measure is calculated by dividing the difference between the measure of difference between the short term distribution and the long term distribution and the alert threshold by the variability measure.

In one embodiment, the method includes maintaining an estimate of the amounts by which the sensitivity to the alert threshold would be needed to have been adjusted in order to not have generated an alert that turned out not to be caused by an event of interest since the last time it was instructed to adapt.

In one embodiment, the sensitivity adjustment estimate is increased by an additive constant each time an alert is generated and decays exponentially with each input received.

In one embodiment, a lead period may be provided during which alerts cannot be generated and the short term distribution and the long term distribution are adapted to all inputs within that period.

Alerts may also be suppressed by inputs that are above a configurable lower percentile or below a configurable upper percentile. The lower percentile and upper percentile are both estimated from the long term probability distribution.

Another aspect of the invention provides a system for detecting changes in the properties of a data stream comprising: distribution maintenance engine configured to maintain a short term distribution that models data stream and a long term distribution that models the data stream; means for determining a difference between the short term distribution and the long term distribution; and an alert generation engine configured to apply a statistical measure to the difference and to generate an alert if the measure of the difference exceeds a threshold.

In one embodiment, the system further comprises a threshold adaptation engine configured to adaptively determine the threshold. Preferably, the distribution maintenance engine is configured to return the short term distribution to a state just before it was updated, when an alert is generated. Preferably, the distribution maintenance engine is also configured to return the long term distribution to a state just before it was updated, when an alert is generated.

BRIEF DESCRIPTION OF THE DRAWINGS

In order to facilitate a better understanding of the nature of the invention, various embodiments will now be described in greater detail, by way of example only, with reference to the accompanying drawings in which:

FIG. 1 is an example of simulated measurements;

FIG. 2 is a schematic representation of a system for detecting changes in the properties of a data stream according to one embodiment of the present invention;

FIG. 4 is a representation of examples of alerts generated in response to the change in simulated measurements of FIG. 1.

DETAILED DESCRIPTION OF CERTAIN EMBODIMENTS OF THE INVENTION

Figure 3:
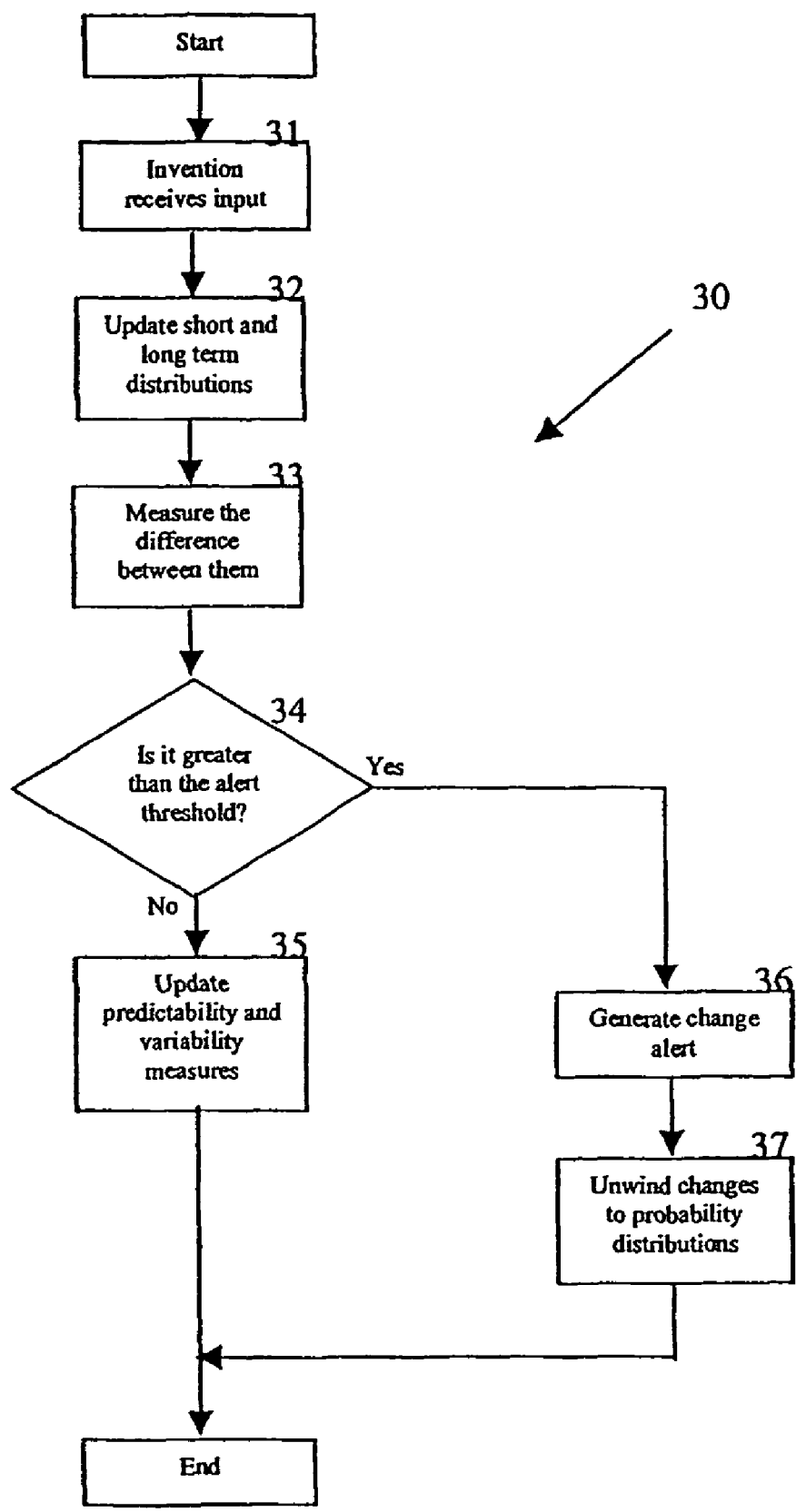
FIG. 3 is a flow chart showing a method of detecting changes in the properties of a data stream in accordance with one embodiment of the present invention.

Referring to FIG. 2 there is shown a system 10 for detecting changes in the properties of a data stream 12 to produce alerts 22 that a target event may be indicated within the data stream 12. The system includes a distribution maintenance engine 14 for maintaining a short term distribution 24 and a long term distribution 26; a means 16 for applying a statistical measure to the difference between the short term distribution 24 and long term distribution 26; an alert generation engine for generating alerts 22 and a threshold adaptation engine 20 for adapting an alert generating threshold to certain conditions.

In one embodiment, the system 10 may be implemented in the form of a computer or a network of computers programmed to perform each of the stages of processing the data from the data stream. For example, a single computer could be programmed to run the system 10 or a dedicated computer may be programmed to run each of the components of the system 10.

Referring now to FIGS. 2 and 3, the short term distribution 24 and long term distribution 26 are recursively estimated weighted distributions of all input data 12 received. They require no explicit storage of the contents of the data stream 12. The short term distribution 24 is a model that weights more recent information in the data stream 12 more highly than the model of the data in the long term distribution, and thus responds more rapidly to changes.

One embodiment of the invention is shown as 30 in FIG. 3. The process 30 is undertaken each time the system 10 receives 31 an input. The distribution maintenance engine 14 maintains the short 24 and long 26 term distribution models updating them when an input 12 is received 31 from the data stream.

The optimal periods required for the short 24 and long 26 term models depend on the particular application of embodiments of the invention and the timescales of the variations that occur within it. For example, when applied to the problem of telecommunications fraud detection, effective periods for the short 24 and long 26 term models have been found to be around 100 and 250 calls respectively. One embodiment of the invention overcomes the limitations of simple threshold-based change detection systems by explicitly modelling the distributions 24 and 26 that describe the data stream 12 and its contents. The short term 24 and long 26 term probability distribution models can each be joint or conditional of several data streams 12, thus permitting the detection of changes in the relationship between the streams and the information they carry.

Additionally, conditional short term and long term probability distribution models allow changes in patterns of sequences of information relating to one or more data streams 12 to be detected. The use of distributions 24 and 26 also means that the system 10 is able to handle arbitrary combinations of continuous and discrete data/information, and hence numeric and categorical information. For example, while searching for telecommunications fraud, it may be useful monitor the cost of calls, and to categorise them as local, national, international, etc.

It is noted that the term probability distribution is usually used when modelling discrete values like integers and densities are usually used when modelling continuous values like real numbers. One embodiment of the invention can be used for either and throughout this specification the term distribution is intended to encompass densities as well, unless this is clearly not intended.

The different rates of response of the short term 24 and long term 26 distributions to changes in a data stream 12 means a difference between the distributions 24 and 26 that can be measured 33 by suitable means 16 using any of a number of standard statistical measures, such as $\chi^2$ or the Kullback-Leibler divergence. A measure of the difference between the short 24 and long 26 term distributions is passed to the alert generation engine 18. The alert generation engine 18 checks 34 whether the difference exceeds an adaptive alert threshold, which is maintained by the threshold adaptation engine 20. The adaptive alert threshold is formed from two components: a predictability measure, which is a moving average of the difference between the short 24 and long 26 term distributions; and a variability measure, which is a moving average of the absolute difference between the difference between the short 24 and long term 26 distributions and the predictability measure. Other means of adapting the threshold, and the statistics from which it is formed, can also be considered. For example, in order to improve robustness, the predictability measure may not be updated when the measured difference between the short 24 and long 26 term distributions exceeds some function of the variability measure.

As with the short 24 and long 26 term distributions, the predictability and variability measures (and hence the alert threshold) are updated 35 every time the system according to one embodiment of the invention receives an input 12, provided that an alert 22 is not generated. The adaptive alert threshold is typically formed from the sum of the predictability measure and some multiple of the variability measure, where the multiple is a sensitivity parameter that is used to control the system's sensitivity (note that increasing the sensitivity parameter reduces the system's sensitivity, in one embodiment). Other functions may be used to adapt the alert threshold. For example, setting the threshold to equal the predictability plus a multiple of the variability squared may give improved performance in some applications.

If the difference between the short 24 and long 26 term distributions exceeds the adaptive alert threshold, then the alert generation engine 18 generates 36 an alert signal 22. The alert signal 22 can contain any of the information available within the system, information presented to the system in the data stream 12, and functions of either and/or both. Typically, however, it contains a propensity measure, which indicates the severity of the change, and detailed information about its exact nature, which can be obtained by examining the differences between the short term 24 and long term 26 probability distributions. One of the simplest forms of propensity measure can be derived by dividing the difference between the measure of the difference between the distributions 24 and 26 and the alert threshold by the variability measure. More sophisticated schemes scale the propensity according to the number of alerts recently generated, and non-linearly processes it so that it always lies between zero and one, in order to improve its interpretability. Detailed information about the exact nature of a change in the data stream can be extracted by measuring the contributions of points on the short 24 and long 26 term distributions to the difference that was measured between them. For example, assuming that the $\chi^2$ measure was used by means 16, the contribution of a point on the short 24 and long 26 term distributions to the measured difference would be given by the $\chi^2$ measure between the distributions 24 and 26 at the point, divided by the total difference for all points that are sampled. In some circumstances, such as when the distributions 24 and 26 are represented by histograms, the contributions are the same for all points within each histogram bin, and hence only need to be computed once within each. The alert 22 signal may also contain additional information, such as a representation of the long term distribution 26, which provides a description of the statistics of the data stream 12 just prior to the change that generated the alert.

The distribution maintenance engine 14 also unwinds 37 an update that caused an alert 22 to be generated, in order to restore the distributions 24 and 26 to their pre-updated state. Restoring the distributions in this way stops the system, according to one embodiment of the invention, adapting to abnormal changes in behaviour. This prevents it from becoming used to any abnormal behaviour that may be sustained in the short term, guaranteeing that it continues to generate alerts 22 throughout, and ensuring that it does not generate alerts 22 when normal behaviour is resumed.

It is not uncommon for changes in data streams to occur that are of sufficient magnitude to cause any change detection algorithm to generate alerts, but which are not target events of interest to the user of the system 10. For example, when the system 10 is used to monitor the behaviour of a subscriber to a telecommunications service, it may generate alerts if they suddenly start to make international calls, perhaps because a friend or relative has moved to another country. When these alerts are investigated by the telecommunications service provider, they will be found to be innocuous, and the provider will expect to be able to instruct the change detection algorithm that no significant change has occurred, and that it should stop generating alerts for the new behaviour and should adapt to it. The system 10 provides such a facility by maintaining an estimate of the amount by which its sensitivity would have needed to have been adjusted in order not to have generated any alerts since the last time it was instructed to adapt. One simple but effective way to produce such an estimate (which works well when the alert threshold is a linear function of the sensitivity parameter, the difference between the short 24 and long 26 term distributions, and the predictability and variability measures) is to maintain a sensitivity adjustment estimate that is increased by an additive constant each time an alert 22 is generated, and decays exponentially with each input the system, in one embodiment, receives. The additive constant and the rate of decay can be determined empirically to give a good trade-off between over-adjustment and the resulting under-sensitivity, and under-adjustment and inadequate desensitisation. When the system 10 receives an adapt signal from the user, it increases its sensitivity parameter by an amount equal to the largest value taken by the sensitivity adjustment estimate since the last time it was instructed to adapt.

Two additional features are supported by the system 10. The first feature allows the method 30 to be applied to data streams 12 that exhibit systematic (i.e. non-random) variation over time. Such variation is frequently encountered when searching for signs of fraud in telecommunications networks. For example, businesses make many calls during weekdays, but few at weekends; conversely, domestic users may make more calls at weekends when some network operators offer lower tariffs. The naïve application of change detection algorithms to these types of data streams can result in large numbers of false alerts as the algorithms respond to the changes in behaviour that occur at the start and end of each weekend. To overcome this problem, the system 10 may support the specification of a lead in period, during which alerts 22 cannot be generated, thereby adapting to all inputs 12. At the end of the lead in period, the number of inputs that were passed to the distribution maintenance engine 14 is recorded and used as the period for updates to the predictability and variability measures, if the number of inputs is larger than the default (which is typically 250 for telecommunications applications). This forces the threshold adaptation engine 20 to adjust the alert threshold more slowly than it would by default, with the result that systematic variations in the input stream 12 similar to those that occurred during the lead in period do not generate alerts 22.

The alert generation engine 18 also allows alerts 22 generated by inputs 12 that are above a configurable lower percentile or below a configurable upper percentile (both estimated from the long term probability distribution 26) to be suppressed. This feature is useful when examining records of call costs for fraudulent behaviour which requires alerts to be produced for increases in the number of medium and high cost calls, which are strongly indicative of fraud, but not for increases in the number of low cost calls, which usually are not. The means by which the percentile estimates are obtained depend on the representations of the distributions.

For example, pseudo-code for calculating a percentile from a histogram-based representation is given below:

```
current_bin = 1;
accumulated_long_term_probability = 0;
while (accumulated_long_term_probability +
long_term_probability_of (current_bin) < required_percentile )
accumulated_long_term_probability=
accumulated_long_term_probability+
long_term_probability_of (current_bin);
    current_bin = current_bin + 1;
end
bin_that_contains_percentile = current_bin;
percentile = min_of (bin_that_contains_percentile) +
      (max_of (bin_that_contains_percentile) − min_of
      (bin_that_contains_percentile) )
      * ( required_percentile − accumulated_long_term_probability )
      / ( long_term_probability_of
      (bin_that_contains_percentile) );
```

Most terms in the pseudo-code are self-explanatory, except for the min_of(.) and max_of(.) functions, which return the smallest and largest values of the input associated with the bin specified in their arguments. The bins are specified by contiguous integers starting at one, and it is assumed that they are ordered according to the ranges of the input that they are they are associated with—that is, bin one is associated with the smallest values of the input. The algorithm first finds the bin that contains the percentile by looking for the bin associated with the smallest values of the input for which the sum of its long term probability and those of all bins associated with smaller values of the input are greater than the required percentile. The specific location of the percentile within the bin is then calculated by assuming that the probability mass associated with the bin is distributed uniformly within it.

As an example of how the system of one embodiment of the invention is applied in practice, consider an instance of the system 10 that models the distribution of telephone calls across ten different categories. These categories could indicate different groups of 'hot' destinations (telephone numbers frequently called by fraudsters). For example, one category could include all telephone numbers in the Caribbean and Pakistan, while another may include all numbers in Brazil and Argentina. To illustrate the effect of a single call on the system of one embodiment of the invention, Table 1 shows the probabilities associated with each of ten categories in the short term 24 and long term 26 distribution within the invention.

TABLE 1

| Category | Short term probabilities | Long term probabilities | Per category $\chi^2$ divergence |
|---|---|---|---|
| 1 | 0.1326 | 0.1226 | 0.0008 |
| 2 | 0.0794 | 0.1012 | 0.0047 |
| 3 | 0.0032 | 0.0394 | 0.0332 |
| 4 | 0.1429 | 0.1311 | 0.0011 |
| 5 | 0.0774 | 0.0979 | 0.0043 |
| 6 | 0.1071 | 0.0882 | 0.0040 |
| 7 | 0.1378 | 0.1247 | 0.0014 |
| 8 | 0.1604 | 0.1613 | 0.0000 |
| 9 | 0.1285 | 0.1034 | 0.0061 |
| 10 | 0.0307 | 0.0302 | 0.0000 |
| Total $\chi^2$ divergence | | | 0.0555 |

Assuming that a call is made to a destination that falls in the first category, the system 10 updates 32 probabilities in its short term 24 and long term 26 distributions to the values shown in Table 2.

TABLE 2

| Category | Short term probabilities | Long term probabilities | Per category $\chi^2$ divergence |
|---|---|---|---|
| 1 | 0.1412 | 0.1261 | 0.0018 |
| 2 | 0.0786 | 0.1008 | 0.0049 |
| 3 | 0.0032 | 0.0392 | 0.0331 |
| 4 | 0.1415 | 0.1306 | 0.0009 |
| 5 | 0.0766 | 0.0975 | 0.0045 |
| 6 | 0.1060 | 0.0879 | 0.0038 |
| 7 | 0.1364 | 0.1242 | 0.0012 |
| 8 | 0.1588 | 0.1606 | 0.0000 |
| 9 | 0.1272 | 0.1030 | 0.0057 |
| 10 | 0.0304 | 0.0301 | 0.0000 |
| Total $\chi^2$ divergence | | | 0.0558 |

These have been computed assuming that the period of the short term model 24 is 100 calls, and that of the long term model 26 is 250 calls, and hence have increased the probability of category one by 1/00 and 1/250 in the short 24 and long 26 term distributions respectively, and renormalizing each distribution. The new $\chi^2$ value is computed 33 in the standard way from the sum of the squared differences between the short 24 and the long term probabilities of each category, divided by the long term probabilities 26, and is given at the bottom Table 2.

Assuming that the predictability measure is 0.0612, the variability measure is 0.0048, and the sensitivity parameter is 5.0 (which has been determined empirically as previously described), the alert threshold is 0.0612+5.0×0.0048=0.0852. Since the new value of $\chi^2$ is less than the alert threshold, no alert is generated, and the predictability and variability measures are updated 35 to be $(1-\alpha) \times 0.0612 + \alpha \times (0.0558 - 0.0612) = 0.0609$ and $(1-\alpha) \times 0.0048 + \alpha \times |0.0558 - 0.0609| \approx 0.0048$ respectively (35), where $\alpha$ is the reciprocal of the period of the long term distribution (i.e. 1/250) and |.| returns the magnitude of its argument.

If the new $\chi^2$ value had been larger than the alert threshold an alert would have been generated 36, the predictability and variability measures would not have been updated and the probabilities in the short 24 and long 26 term probability distributions would be restored 37 to their previous values by subtracting 1/(1+100) and 1/(1+250) from the probabilities for category one and renormalizing. It should be emphasised that this example is a specific realization of the invention and most of the details are peculiar to the realisation and not fundamental to the invention itself.

In one embodiment, a simulated application is shown in FIG. 4. Each continuous block of alerts is shown as a vertical black bar. One embodiment of the invention produces a large number of change alerts in response to the change in simulated measurements and it is clear that one embodiment of the invention produces no change alerts outside the region of the pathological behaviour, and many within it, thus giving good discrimination. Note that although the change in the data stream shown in FIG. 4 can be detected by placing a threshold on the variance of the spring length measurements, there may be other modes of failure or combinations thereof that cause changes that cannot be detected in ways that can easily be specified a priority.

The skilled addressee will realise that various embodiments of the invention have the following advantages:

One embodiment of the invention can discriminate between behaviours that cannot be distinguished using thresholds and summary statistics due to the behaviour of the date stream being modelled by short term and long term probability distributions;

The distributions and densities are estimated recursively, and hence the invention requires no explicit storage of information from the data stream;

Another embodiment of the invention can model multivariate and conditional properties of a data stream, making it possible to detect changes in interactions between different streams, and changes in the patterns of sequences that occur within a stream;

Another embodiment of the invention measures the rate of change of behaviour by measuring the divergence between the short term and long term distributions;

Another embodiment of the invention maintains statistics concerning the typical rate of change in the data stream that are used to compute an adaptive threshold that, in turn, controls the generation of alerts;

Still another embodiment of the invention generates alerts when the measured divergence exceeds an adaptive threshold;

The alerts generated by the invention contain detailed information about its cause— i.e. the way in which the stream's behaviour has changed;

Still another embodiment of the invention estimates the amount by which its internal sensitivity would need to be adjusted in order to produce an alert rate of around one percent; and Yet another embodiment of the invention can be forced to adjust its internal sensitivity by an externally specified amount, or according to its own internal estimate.

The skilled addressee will realize that various embodiments of the invention are applicable to detecting changes in the properties of data streams originating from various sources. Even though embodiments of the invention have been described with respect to telecommunications fraud detection, the invention may be suitable for numerous other applications where data contains information about some entity or process. Examples include but are not limited to: credit card fraud detection system; computer network security; process, fault and condition monitoring; environmental monitoring systems; and health monitoring systems. Such modifications and variations as would be readily apparent to the skilled addressee to enable embodiments of the invention to detect changes in the properties of data streams from various sources are intended to fall within the scope of the invention, the nature of which is to be determined from the foregoing description and appended claims.

The invention claimed is:

1. A method of detecting a target event based on a data stream, the data stream representing events accessed with a computerized monitoring system, the method being implemented on a computer or a network of computers having a memory and one or more processors, the method comprising:

maintaining a short term distribution that models the data stream in the memory, wherein the short term distribution is updated when input data is received;

maintaining a long term distribution that models the data stream in the memory, wherein the long term distribution is updated when the input data is received;

determining a distribution difference with the one or more processors, the distribution difference being based on a difference between the short term distribution and the long term distribution;

applying a statistical measure to the distribution difference with the one or more processors, the statistical measure comprising both an average of the distribution difference and an average difference between the distribution difference and the average of the distribution difference; and generating an alert when the measure of the difference exceeds a threshold using one or more of the processors, the alert indicating an occurrence of a target event to a person or a machine, wherein when the alert is generated the short term distribution in the memory is returned to a state just before it was updated to include an input that caused the alert, and the long term distribution is returned to a state just before the long term distribution was updated to include the input that caused the alert.

2. A method according to claim 1, wherein the short term distribution is a model of probability distributions that describe the data stream.

3. A method according to claim 1, wherein the long term distribution is a model of probability distributions that describe the data stream.

4. A method according to claim 1, wherein the short term distribution is a recursively estimated weighted distribution of all the data received thus far.

5. A method according to claim 1, wherein the long term distribution is a recursively estimated weighted distribution of all of the data received thus far.

6. A method according to claim 1, wherein the short term distribution weights recent information more heavily than the long term distribution.

7. A method according to claim 1, wherein an alert is generated when the distribution difference exceeds an adaptive alert threshold.

8. A method according to claim 7, wherein the adaptive alert threshold is a function of the short term and long term distributions and previous values of the alert threshold.

9. A method according to claim 7, wherein the adaptive alert threshold is formed from a predictability measure and a variability measure.

10. A method according to claim 9, wherein the predictability measure is a moving average of the difference between the short term distribution and the long term distribution.

11. A method according to claim 9, wherein the variability measure is a moving average of the absolute difference between the difference between the short term distribution and the long term distribution and the predictability measure.

12. A method according to claim 9, wherein the predictability and variability measures are not updated when the difference between the short term distribution and the long term distribution exceeds a function of the variability measure.

13. A method according to claim 7, wherein the generated alert includes information in the data stream and/or a function of information in the data stream.

14. A method according to claim 13, wherein the generated alert includes a propensity measure as an indication of a severity of change.

15. A method according to claim 14, wherein the propensity measure is calculated by dividing the difference between the difference between the short term distribution and the long term distribution and the alert threshold by the variability measure.

16. A method according to claim 1, further comprising maintaining an estimate of amounts by which a sensitivity to the alert threshold would be needed to have been adjusted in order to not have generated an alert that turned out not to be caused by an event of interest since the last time the sensitivity to the alert threshold was instructed to adapt.

17. A method according to claim 16, wherein the sensitivity adjustment estimate is increased by an additive constant each time an alert is generated and decays exponentially with each input received.

18. A method according to claim 1, wherein a lead period may be provided during which alerts cannot be generated and the short term distribution and the long term distribution are adapted to all inputs within that period.

19. A method according to claim 1, wherein alerts may be suppressed from being generated by inputs that are above a configurable lower percentile or below a configurable upper percentile.

20. A method according to claim 19, wherein the lower percentile and upper percentile are both estimated from the long term distribution.

21. A method according to claim 1, wherein the short term and long term distributions model discrete values.

22. A method according to claim 1, wherein the short term and long term distributions model continuous values.

23. A system configured to detect a target event of a computerized monitoring system, the system comprising:
a memory configured to store a short term distribution that models a data stream and a long term distribution that models the data stream, the data stream representing events accessed with the computerized system; and
a processing module configured to update the stored short term distribution and the stored long term distribution when input data is received,
wherein the processing module is configured to determine a distribution difference, the distribution difference being based on a difference between the short term distribution and the long term distribution,
wherein the processing module is configured to apply a statistical measure to the distribution difference, the statistical measure comprising both an average of the distribution difference and an average difference between the distribution difference and the average of the distribution difference, the processing module being further configured to generate an alert when the measure of the difference exceeds a threshold, the alert indicating an occurrence of the target event to a person or a machine, and
wherein the processing module is configured to return the stored short term distribution and the stored long term distribution to a respective state before being updated by an input that caused the alert to be generated.

24. A system according to claim 23, further comprising a threshold adaptation module configured to adaptively determine the threshold.

25. A system according to claim 23, wherein the processing module is configured to return the short term distribution to a state just before it was updated, when an alert is generated.

26. A system according to claim 23, wherein the processing module is configured to return the long term distribution to a state just before it was updated, when an alert is generated.

27. A system configured to detect a target event of a computerized monitoring system, the system comprising:
means for maintaining a short term distribution that models a data stream, the data stream representing events accessed with the computerized system, wherein the short term distribution is updated when input data is received;
means for maintaining a long term distribution that models the data stream, wherein the long term distribution is updated when the input is received;
means for determining a distribution difference, the distribution difference being based on a difference between the short term distribution and the long term distribution;
means for applying a statistical measure to the difference, the statistical measure comprising both an average of the distribution difference and an average difference between the distribution difference and the average of the distribution difference;
means for generating an alert when the measure of the difference exceeds a threshold, the alert indicating an occurrence of the target event to a person or a machine; and
means for returning the short term distribution to a state before it was updated by an input that caused the alert and for returning the long term distribution to a state before it was updated by the input that caused the alert.

28. A method of detecting changes in the properties of a data stream, the data stream representing events occurring within a telecommunications system, the events accessed with a computerized monitoring system having a first memory element, a second memory element, and one or more processors, the method comprising:
maintaining a short term distribution in the first memory element that models the data stream, wherein the short term distribution is updated when input data is received;
maintaining a long term distribution in the second memory element that models the data stream, wherein the long term distribution is updated when the input data is received;
determining a distribution difference using the one or more processors, the distribution difference being based on a difference between the short term distribution and the long term distribution;
applying a statistical measure to the distribution difference using the one or more processors, the statistical measure comprising both an average of the distribution difference and an average difference between the distribution difference and the average of the distribution difference; and
generating an alert when the measure of the difference exceeds a threshold using the one or more processors, the alert indicating an occurrence of a target event to a person or a machine,
wherein when an alert is generated the short term distribution in the first memory element is returned to a state just before it was updated to include an input that caused the alert, and wherein when an alert is generated the long term distribution in the second memory element is returned to a state just before the long term distribution was updated to include the input that caused the alert.

29. The method of claim 28, wherein the target event comprises telecommunications fraud.

30. A method of detecting changes in the properties of a data stream, the data stream representing events accessed with a computerized monitoring system having a first memory element, a second memory element, and one or more processors, the method comprising:

- maintaining a short term distribution that models the data stream in the first memory element, wherein the short term distribution is updated when input data is received;
- maintaining a long term distribution that models the data stream in the second memory element, wherein the long term distribution is updated when the input data is received;
- determining a distribution difference using the one or more processors, the distribution difference being based on a difference between the short term distribution and the long term distribution;
- applying a statistical measure to the distribution difference using the one or more processors, the statistical measure comprising both an average of the distribution difference and an average difference between the distribution difference and the average of the distribution difference; and
- generating an alert when the measure of the difference exceeds a threshold, the alert indicating an occurrence of a target event to a person or a machine,
- wherein when an alert is generated the short term distribution in the first memory element is returned to a state just before it was updated to include an input that caused the alert,
- wherein when an alert is generated the long term distribution in the second memory element is returned to a state just before it was updated to include the input that caused the alert, and
- wherein the accessed events occur within one of:
- a telecommunications system and the target event comprises telecommunications fraud;
- a credit card system and the target event comprises credit card fraud;
- a computer network security system and the target event comprises a security concern;
- an environmental monitoring system and the target event comprises an environmental change; and
- a health monitoring system and the target event comprises a change in a health condition of a patient.

* * * * *

UNITED STATES PATENT AND TRADEMARK OFFICE
CERTIFICATE OF CORRECTION

PATENT NO. : 7,620,533 B2  Page 1 of 1
APPLICATION NO. : 11/654800
DATED : November 17, 2009
INVENTOR(S) : George Bolt and John Manslow It is certified that error appears in the above-identified patent and that said Letters Patent is hereby corrected as shown below:

At Column 7, Lines 45-46, after "they are" please delete "they are".

At Column 7, Line 67, please delete "distribution" and insert therefore, --distributions--.

At Column 8, Line 19, after "32" please insert --the--.

At Column 8, Line 45, after "and" please delete "the".

At Column 8, Line 45, after "long" please insert --26--.

Signed and Sealed this

Twentieth Day of April, 2010

David J. Kappos
*Director of the United States Patent and Trademark Office*